Oct. 11, 1938.　　　　J. B. MORGAN　　　　2,132,961
CLEANER FOR COFFEE AND OTHER GRAINS
Filed Sept. 5, 1936　　　3 Sheets—Sheet 1
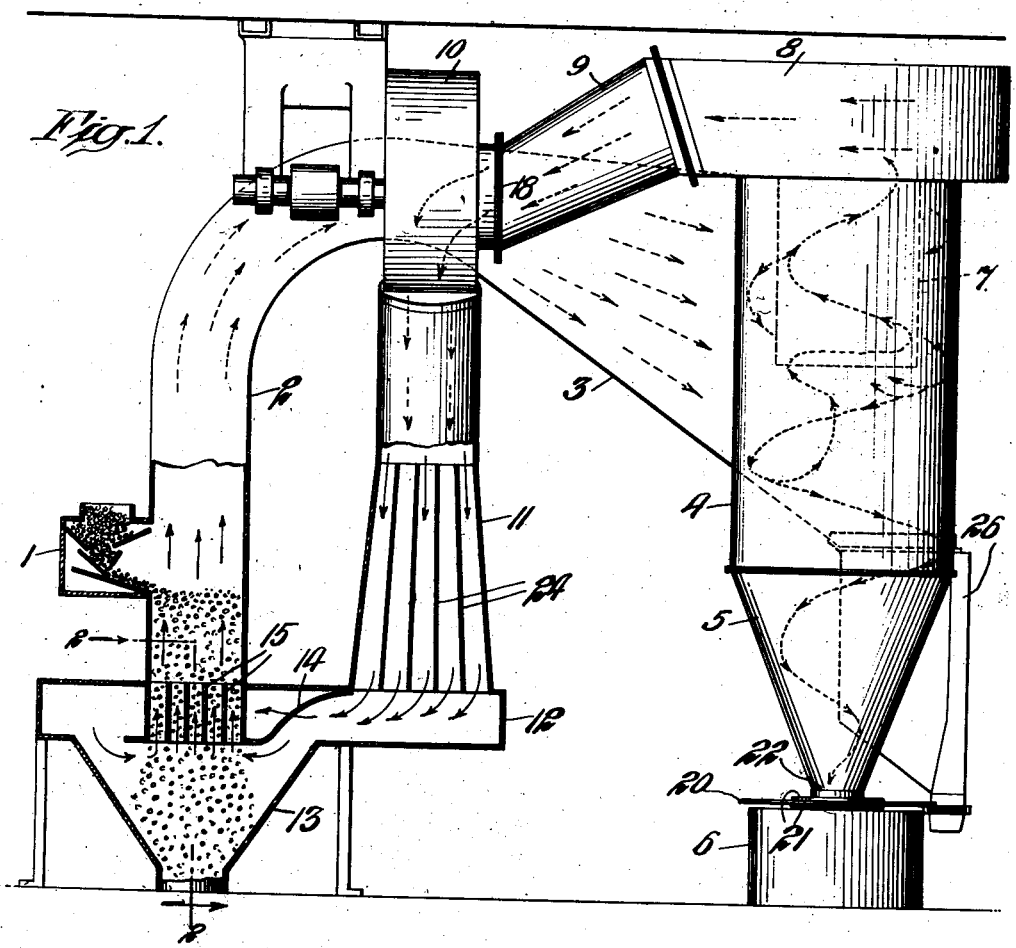
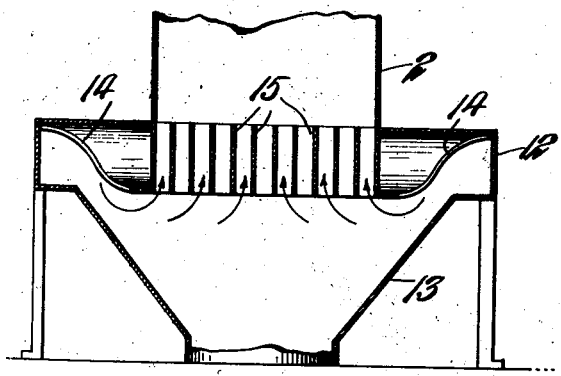
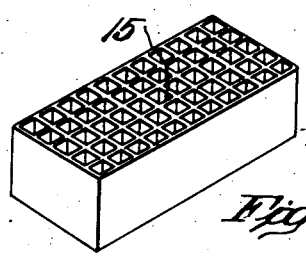
INVENTOR
Joseph B. Morgan
BY Sager & Malcolm
ATTORNEYS INVENTOR
JOSEPH B. MORGAN
BY Sager & Malcolm
ATTORNEYS Oct. 11, 1938.  J. B. MORGAN  2,132,961
CLEANER FOR COFFEE AND OTHER GRAINS
Filed Sept. 5, 1936  3 Sheets-Sheet 3
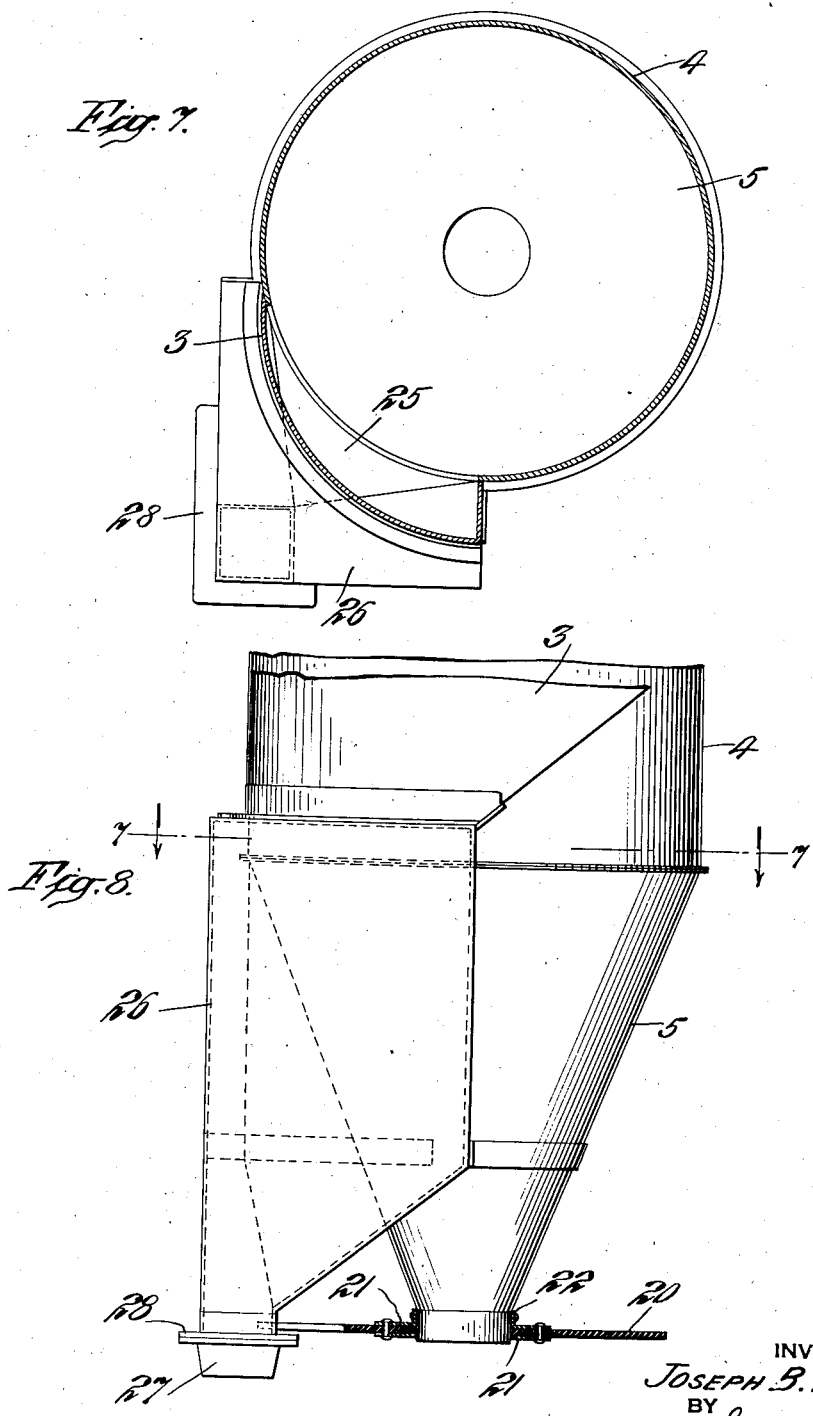
INVENTOR
JOSEPH B. MORGAN
BY
Sager & Malcolm
ATTORNEYS Patented Oct. 11, 1938

2,132,961

UNITED STATES PATENT OFFICE 2,132,961

CLEANER FOR COFFEE AND OTHER GRAINS

Joseph B. Morgan, Flushing, N. Y., assignor to Jabez Burns & Sons, Inc., New York, N. Y., a corporation of New York Application September 5, 1936, Serial No. 99,511

1 Claim. (Cl. 209—139)

This invention relates to apparatus for cleaning coffee, cocoa beans, peanuts, grain and other similar goods either green or roasted, in their whole, cracked, granulated or ground state as such cleaning may be necessary or can best be accomplished.

The object of the invention is to provide improved apparatus employing air to separate goods of the above type from comparatively heavier, that is denser, foreign materials such as stones, nails, etc., or from comparatively lighter, that is less dense, refuse such as dust, strings, hulls, chaff, sticks, etc., and a particular object is to effect a more thorough separation of such materials than has been accomplished heretofore.

Inasmuch as the separation of the foregoing material by air involves consideration both of the weight of the material and its surface area, I shall make use of the expression "density" to denote weight of the substance per unit surface area. As the object to be attained and the means employed are similar for the various types of separation which can be made according to my invention, I shall refer particularly to apparatus for separating a product such as green coffee from less dense foreign materials, although it will be evident as the description progresses that the same apparatus may be used equally well for the removal of foreign materials of denser composition.

Much of the foreign matter found in coffee beans is approximately the same size as the beans and therefore cannot be removed by sifting. For this reason it is customary to use air to separate the beans from the foreign matter. The usual air separator consists of a vertical pipe or riser in which an upward current of air is produced by an exhaust fan. The goods are fed in at the lower end of the pipe which is usually known as the boot, and the air is so regulated that it lifts the lighter or less dense material but leaves the denser material behind.

An important feature of the present invention resides in the provision of means for eliminating eddy currents and insuring a uniform flow of air in the air pipe or riser, and for increasing the velocity of the air adjacent the feed opening through which the materials to be separated are introduced into the air pipe. Ordinarily in apparatus of this kind there is a tendency for a portion of the incoming material to drop through the air pipe in a relatively concentrated stream carrying with it an appreciable amount of lighter foreign matter which is thus prevented from being subjected to the lifting action of the ascending stream of air and therefore is not removed from the denser material as it should be. My invention avoids this difficulty and insures a more thorough separation than heretofore by raising the velocity of the air adjacent the feed opening above that in the remainder of the stream, with the result that the material adjacent the feed opening is deflected into the body of the air stream and subjected to the weighing action of the air current so that a thoroughly effective separation is assured.

Heretofore the air pipe or riser in a system of the type referred to herein has terminated at the upper end either in a hopper designed to receive the coffee beans or the like in cases where the object has been to lift and separate the beans from stones and other denser foreign materials, or, when the object has been to lift and remove dust, chaff and other less dense trash separated from the beans, the air pipe in which the separation takes place has usually been led through a window or equivalent outlet for the purpose of discharging the separated trash into the atmosphere. One objection to this latter practice is that it results in fouling the air and surrounding buildings. Another disadvantage, which is particularly serious from an economic standpoint, is that it withdraws heated air from buildings in the winter or cooled air from air-conditioned plants in warm weather, thereby entailing a substantial waste of fuel or power. My invention avoids these disadvantages of the prior art by providing a completely enclosed separating system in which the same air is continuously recirculated and in which the coffee beans or other product and the separated trash, either heavier or lighter than the product as the case may be, are both continuously removed from the system without manual operation or supervision of any kind.

The foregoing, as well as various other novel features and advantages of the invention, will be described in connection with the accompanying drawings, in which:

Fig. 1 is a side elevation, partly in section, of a recirculating cleaner embodying the invention;

Fig. 2 is a vertical section taken on line 2—2 of Fig. 1;

Fig. 3 is a perspective view of the means for producing a uniform flow of air in the separating pipe or riser;

Fig. 7 is a transverse section taken on line 7—7 of Fig. 8, through the lower discharge end of the air separator; and

Figure 4:
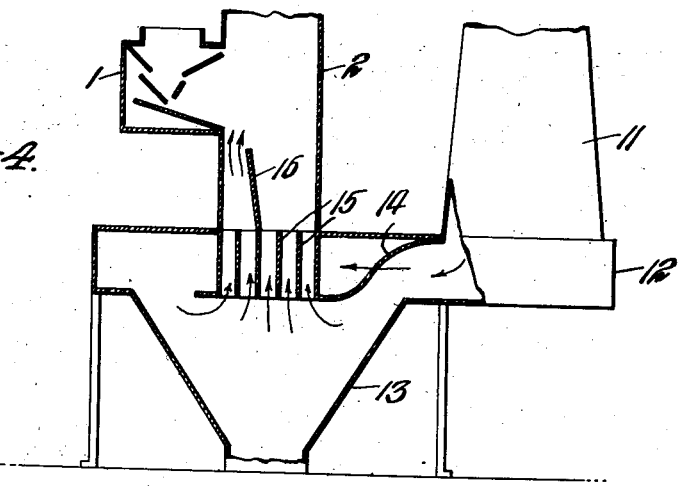
Figs. 4, 5 and 6 are vertical sectional views showing alternative arrangements for controlling the flow of air in the riser.

Fig. 8 is an elevational view of the lower discharge end of said separator.

In the drawings, the feed chute 1 is adapted to control the flow of goods through the associated feed inlet into a vertical air pipe or riser 2 of rectangular cross-section which is connected by suitable piping 3 to the inlet of a cyclone separator 4. This separator, which may be of the type shown in Keenan Patent #2,033,471 of March 10, 1936, has a lower conical hopper 5 for conveying the separated material to a receptacle 6, and an upper central discharge pipe 7 which is connected, as by means of an outlet scroll 8 according to Keenan Patent #2,033,470 of March 10, 1936, to the piping 9 on the inlet side of an exhaust fan 10. The discharge side of the fan 10 is connected by return pipe 11 to the housing 12 which encloses the lower or air inlet end of the riser 2 and terminates in a discharge chute 13 through which the denser separated goods are conveyed from the riser. Air from the return pipe 11 is directed into the lower end of the riser by a baffle 14 which is mounted in the housing 12 as shown in Fig. 1.

I have shown the exhaust fan 10 located with its inlet connected to piping 9, and its discharge side connected to return pipe 11; that is, the fan is located between the separator outlet and the bottom of the riser, as this arrangement prevents foreign material such as sticks, strings, etc. from passing through the fan. The latter may, however, be located between the top of the riser and the separator. In such case the fan inlet would be connected to the top of riser 2, and the discharge side of the fan 10 would be connected to the approach pipe 3. The outlet scroll 8 of the separator would then be connected to return pipe 11.

Figure 5:
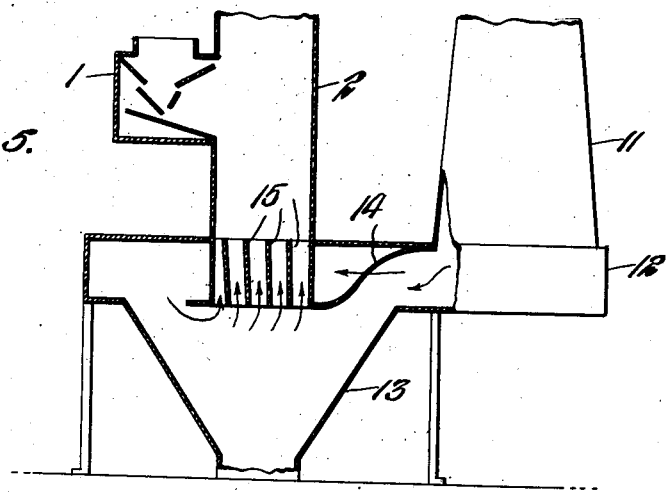
Figure 6:
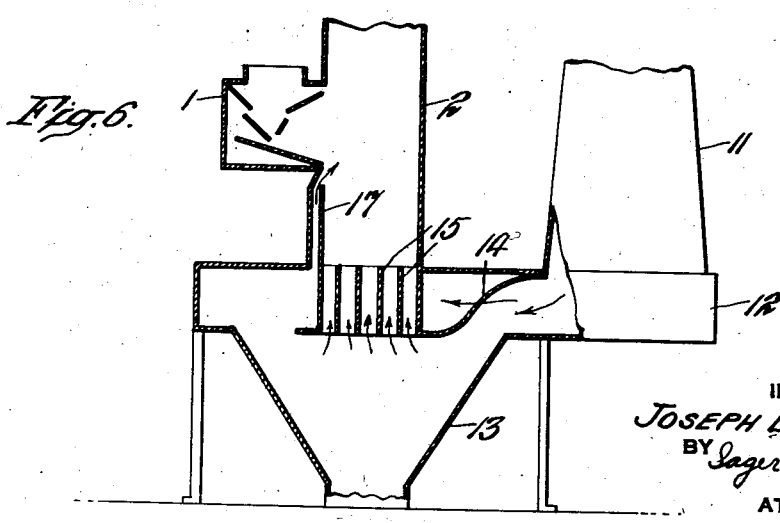

The lower end of the riser 2, between the goods inlet 1 and the air inlet housing 12, is divided by intersecting vanes or partitions 15 into a plurality of relatively small vertical channels or air passages of rectangular cross-section forming a net work of open ended cells as shown in Figs. 1 to 3. This arrangement of air passages, which may be likened to an egg crate, eliminates eddy currents and results in a uniform flow of air in the riser. The feed chute 1 may be adjusted to control the rate of cleaning by regulating the flow of goods to the riser 2, and it is also constructed as illustrated to spread the goods uniformly across the riser. However, in spite of the uniform controlled feed, there is always a tendency for a portion of the goods to bunch up and drop in a relatively dense stream along the wall of the riser containing the feed opening at the left-hand side of Fig. 1, carrying lighter foreign matter with the stream into the discharge chute 13 unless means are provided to prevent such condition. My invention overcomes this difficulty in any one of several ways as illustrated in Figs. 4 to 6.

In Fig. 4 a baffle or guide vane 16 is mounted in the riser 2 widthwise or coextensive with the feed chute 1, extending upwardly from the partitions 15, and is inclined from the vertical toward the feed opening. This construction produces a nozzle effect which results in a higher velocity of air between the feed opening and the guide vane 16 than across the remainder of the stream, whereby the goods entering the riser from the feed chute are deflected outwardly into the ascending body of air and prevented from dropping in a concentrated stream along the wall of the riser containing the feed opening. In Fig. 5 the same result is accomplished by inclining the transverse vanes or partitions 15, i. e. the vanes 15 coextensive with the feed opening, from the vertical toward the feed opening. In Fig. 6 a restricted secondary air passage is formed by an elongated vertical guide van 17 which is mounted between the partitioned member 15 and the wall of the riser beneath the feed chute 1, opening into the riser 2 just below the feed chute so that the ascending secondary stream of air is contracted and its velocity increased at the feed side of the riser.

In the operation of the apparatus, a gate 18 on the inlet of exhaust fan 10 is adjusted so that the amount of air passing up the riser 2 is sufficient to lift all the dust, strings, sticks, paper and other light foreign matter into the separator 4 at the desired rate of flow without lifting the coffee beans. Due to the higher velocity of the air adjacent the feed side of the riser 2, as explained in connection with Figs. 4, 5 and 6, the goods entering the riser are deflected outwardly and distributed over the ascending current of air where a weighing action takes place with the result that the relatively less dense foreign matter is separated out and lifted through the riser and into the separator 4 while the relatively dense coffee beans drop through the riser and into the discharge chute 13. The air laden with the refuse enters the separator 4 through approach pipe or squeezer 3 having a narrow vertical portion where it connects with the separator and the refuse is thrown outwardly and conveyed by hopper 5 to the receptacle 6 while the cleaned air passes out through the central discharge pipe 7 into scroll 8 and thence through pipe 9 and fan 10, return pipe 11 and housing 12 to the bottom of the riser. In the form illustrated the receptacle 6 is closed by a cover comprising a rubber or other flexible disc 20 which is clamped at the center between flanges 21 carried by a collar 22 loosely mounted on the lower end of the separator hopper 5. When the exhaust fan 10 is operating, the pressure in receptacle 6 is below that of the atmosphere and the rubber disc 20 is therefore forced tightly against the top of the receptacle by the greater outside pressure of the atmosphere. To empty the receptacle 6 the cover 20 is simply raised and the receptacle withdrawn.

In order to save energy, the pipe 11 connecting the outlet of fan 10 with the inlet to the housing 12 is made of gradually increasing cross-sectional area in the direction of stream flow, to act as a diffuser and gradually reduce the high velocity produced by the exhaust fan to approximately the same as, or less than, the velocity of the air stream in the riser 2. To further save energy, I may also divide this diffuser by a series of intersecting vanes or partitions 24, into a plurality of relatively small air channels. These channels are illustrated in Fig. 1 as being of rectangular cross-section except where altered by the contour of the surface of the diffuser pipe 11. This arrangement of air passages forming a net work of open ended cells, previously likened to an egg crate, compels each air passage or channel to act not only as a diffuser, as its cross-section gradually increases in the direction of air flow, but also to act to iron out or eliminate eddy currents, which still further increases the efficiency of the device.

In treating some materials such as green coffee in the apparatus described above, a very small percentage of the product, particularly some of the lighter beans, have a tendency to drop through the hopper 5 of the separator 4 and to be discharged into the receptacle 6 with the refuse. However, such loss of valuable product, which might be appreciable over a period of time, is prevented by the means shown in Figs. 7 and 8. Any beans which may happen to be carried up through the riser 2 into the separator 4 must, of course, enter the separator through the approach pipe 3, and I find that such beans, because of their weight, almost invariably descend during their passage through the approach pipe 3 and enter the separator 4 along the bottom surface of the approach pipe. Accordingly, by cutting away the bottom of the narrow portion of the approach pipe 3 at the point where pipe 3 intersects the cylinder 4, to provide an arcuate opening 25 as illustrated in Fig. 7, practically all of the beans entering the separating cylinder will drop through the opening 25 and into the collector 26 which I provide for this purpose as illustrated in Figs. 7 and 8, while practically all of the refuse will continue on into the separator and be collected in the receptacle 6 as previously described. The collector 26 has a spout 27 at its lower end provided with a suitable gate 28 which may be opened when desired to discharge the accumulation of product in the collector.

The invention as outlined above permits of an accurate separation of a product such as green or roasted coffee from less dense foreign matter such as dust, strings, sticks, paper, loose chaff, hulls, etc., but it will be evident that it is equally useful in separating a product such as roasted coffee from denser foreign matter such as stones, nails, etc. In the latter case the comparatively light product is lifted in the riser and separated from the air in the separator 4 while the denser foreign matter is collected in the discharge chute 13. Certain products such as green coffee, raw shelled peanuts, etc., are very nearly the same density as some of the foreign materials such as small stones and nails which are to be removed, hence such refuse is customarily separated when the product is in the roasted state as it is then comparatively less dense than in the green or raw state. Cocoa beans, on account of their large size, can usually be separated from the heavier as well as from the lighter refuse when in the raw state, the amount of air in the riser being first adjusted to lift and remove the lighter refuse such as dust, hulls, etc., after which the product may be subjected to a second treatment with the air current adjusted to lift the product and separate it from stones, nails and other heavier refuse which is left behind. The invention may likewise be used to advantage for cleaning rice, wheat and the whole category of grains which contain foreign matter heavier or lighter than the goods to be cleaned.

In addition to effecting a more thorough separation of foreign matter from coffee and other grains than heretofore, my invention provides an effective means of disposing of the separated refuse which up to now has customarily been discharged into the outside atmosphere with resulting contamination of the air and surrounding properties. Another disadvantage of the prior practice is that it withdraws heated air from buildings in the winter or cool air from air-conditioned plants in the summer, in either case entailing a considerable economic waste of power which is avoided by my improved recirculating system.

Although certain preferred embodiments of the invention have been disclosed for purposes of illustration, it will be evident that various changes and modifications may be made therein without departing from the scope and spirit of the invention which is only to be limited in accordance with the following claim when interpreted in view of the prior art.

The invention claimed is:

Apparatus for separating materials of different densities comprising a vertical air pipe having an air inlet at the bottom and an air outlet at the top and having a feed opening at the side thereof between the inlet and outlet, means for circulating air upwardly through said pipe for carrying the less dense materials up through the outlet while the materials of greater density fall through the air inlet, vertically extending partitions across the area of said pipe for forming vertical open ended channels in said pipe for reducing eddy currents, said partitions being located below said feed opening a substantial distance and above said inlet and serving as passageways for the downward passage of the materials of greater density through said air inlet, and a guide vane in said pipe between said channels and said feed opening, said guide vane extending substantially from the tops of said partitions to the lower edge of said opening and being inclined relatively to the side walls of the pipe with its upper end nearer than its lower end to the wall containing the feed opening, thereby directing the air flow at said feed opening at a higher velocity than other portions of the air flow for distributing the material from the feed opening over the area of said pipe.

JOSEPH B. MORGAN.